Aug. 25, 1953     J. W. ARNOLD     2,649,830
EXPANDING SPRING ANCHOR NUT
Filed July 20, 1950
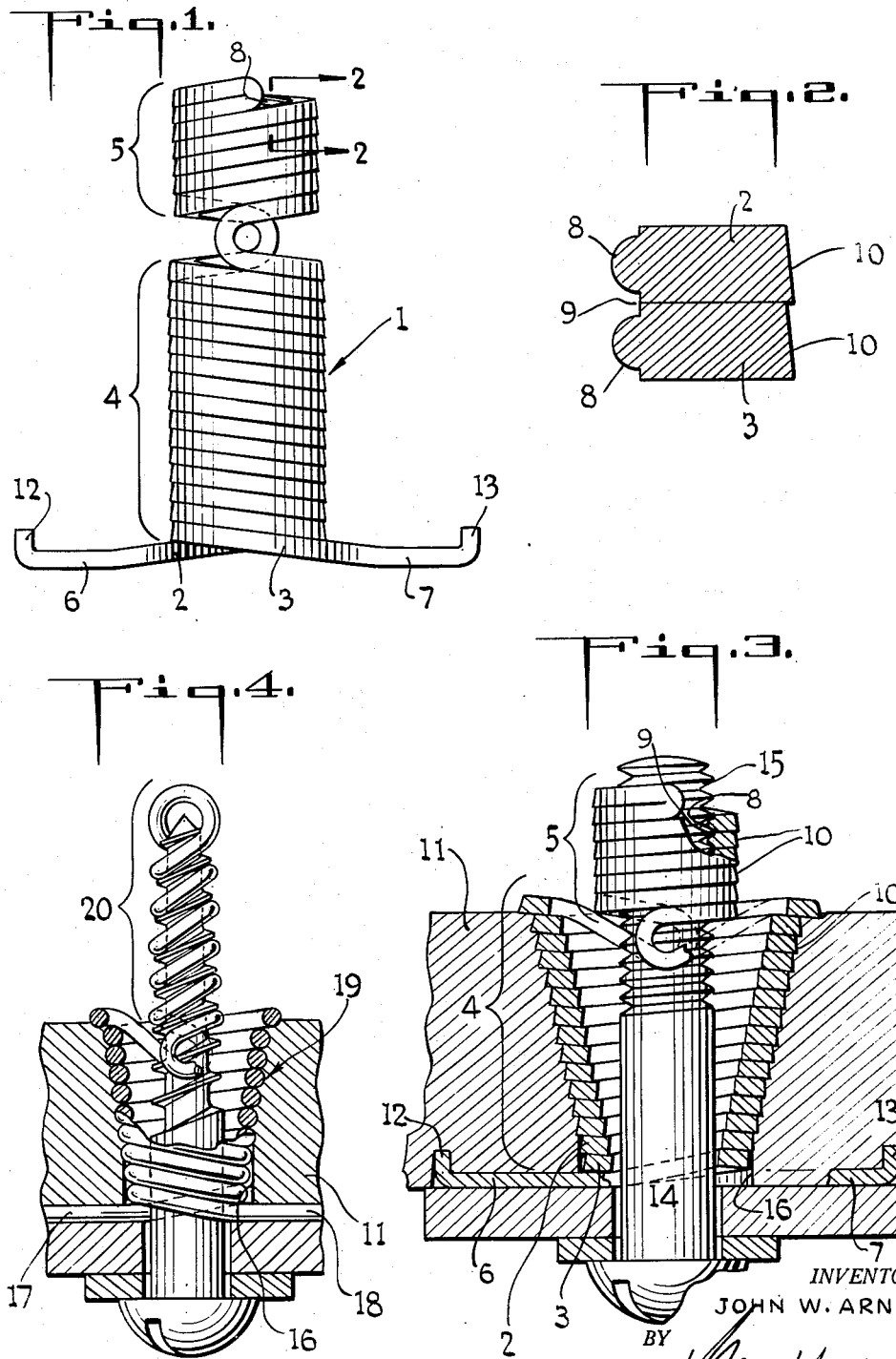
INVENTOR.
JOHN W. ARNOLD
BY
ATTORNEY Patented Aug. 25, 1953

2,649,830

UNITED STATES PATENT OFFICE 2,649,830

EXPANDING SPRING ANCHOR NUT

John William Arnold, Newark, N. J., assignor to The Elwood Research Company, a division of Chiselhurst, Inc., Newark, N. J., a corporation of New Jersey Application July 20, 1950, Serial No. 174,883

5 Claims. (Cl. 85—2.4)

The present invention deals with a fastening device and more particularly with an expansion fastener of the type employed with screws and bolts.

Expansion devices associated with screws and bolts are generally employed for use in connection with materials in which ordinary screws or bolts are unsatisfactory for fastening purposes, or for use in applying screws or bolts into enlarged openings or holes. For example, walls or other structures of brick, stone, cement, plaster board, plaster, etc., are not conducive to the formation of threaded surfaces cooperative with screws or bolts for securing a strong anchorage, and additional means, such as expanders, must be resorted to for gripping purposes. Also, enlarged holes, such as are caused to occur in connection with door hinges, etc., weaken the supporting action of wood screws and are advantageously corrected by the use of expanders without the necessity of moving such screws to new locations.

Various types of expansion fasteners have been proposed and utilized. Some types necessitate the use of a plurality of embodiments or parts, which increase production costs and time of manufacture. Other types necessitate the use of specific type screws and bolts, etc., in combination therewith.

It is an object of the present invention to provide an expansion fastener operable with conventional screws and bolts. It is another object of the present invention to provide an expansion fastener economical to manufacture, having a superior gripping action, and applicable for use with various materials. It is a further object of the present invention to provide an improved expansion fastener of a simple and durable construction. Other objects of the present invention will become apparent from the description hereinafter following and the drawings forming part hereof, in which:

Fig. 1 is an elevational view of the expansion fastener according to the present invention, Fig. 2 is an enlarged sectional view along the lines 2—2 of Fig. 1, Fig. 3 illustrates a partly elevational and partly sectional view of the expansion fastener and cooperating bolt therefor in fastening position, and Fig. 4 illustrates a modification of the present invention.

According to the present invention the expansion fastener consists of a single wire or of a plurality of parallel wires of either substantially rectangular, round or other suitable cross section helically wound to provide a heterophase coil, i. e. a coil having at least two distinct axially spaced winding phases with a portion of the coil being wound in one direction and another portion in another direction, whereby one of said coil portions is laterally expandable when a screw or bolt is rotated within another portion.

Fig. 1 illustrates an expandable fastener 1 consisting preferably of a pair of parallel wires 2 and 3 of substantially rectangular cross-section helically wound in counterclockwise direction to form a winding phase 4 of said fastener and in clockwise direction to form a winding phase 5 of said fastener to provide a heterophase helical winding. Between said winding phases each wire is bent in a substantially U-shape in order to permit a reversed helical winding. The end portions 6 and 7 of each wire extend laterally outward from an end of said fastener for abutting against a surface into which a hole is formed to act as an anchor means and to prevent said fastener from rotating when a bolt or screw is applied thereto. The portion 5 of said heterophase expansion fastener is cooperative with the threaded portion of a bolt or screw and engageable therewith in frictional contact to permit helical advancement of the screw or bolt, while the portion 4 of said expander is preferably of a larger inside diameter to allow free access of a screw or bolt therethrough.

Fig. 2 illustrates an enlarged sectional view along lines 2—2 of Fig. 1 showing a cross-section of a wire especially adapted for use with screws having threads with flat peripheral surfaces.

The wire cross-section shows a wire, when helically wound as above described, having an inner surface provided with a helical projection 8 spaced from the inner edges of the wire to provide a helical groove 9 receptive to said flat peripheral thread surfaces. It is apparent that there is a difference between the inner diameters of the winding phases when only one of such phases is provided with such projection so that the winding phase which is free of an inner projection allows free access of a screw therethrough.

The outer surface 10 of the wire is preferably beveled so that, when wound as illustrated, a sharp edge of said surface provides a gripping means against the walls of an aperture.

Fig. 3 illustrates an expansion fastener according to the present invention and a cooperating bolt therefor.

In applying the expansion fastener to an aperture, the fastener is first inserted into the aperture formed into a wall 11, or other structure, and positioned therein by means of the end portions 6 and 7 which are nested into grooves formed into the surface of the wall 11 radially of said aperture. The ends 6 and 7 of the wires may be bent to provide lugs 12 and 13 which act as supplemental anchors in holding the fastener in the aperture prior to the insertion of the bolt 14 therethrough. In inserting the bolt 14, it first passes freely through the winding phase 4 and the threaded portion 15 of the bolt then engages the winding phase 5 in frictional contact with the helical groove 9 for helical advancement of the bolt through said portion 5 whereby, due to the fact that the fastener is anchored at the surface of the wall 11, the winding phase 5 is caused to approach the winding phase 4. Since the winding phase 4 is wound in reverse direction to that of the winding phase 5, the approach of the winding phase 5 toward the phase 4 causes the winding 4 to unwind and expand laterally against the walls 16 of the aperture. It is apparent that, although not critical, the helical winding of the winding phase 4 is slanted sufficiently to decrease the resistance to unwinding whereby the force exerted by the approach of the winding phase 5 increases the unwinding action of the winding phase 4.

Fig. 4 illustrates a modification of the present invention whereby rectangular wires may be substituted by round wires 17 and 18 to provide a heterophase expansion fastener 19 in which it is unnecessary to provide an internal helical projection similar to the projection 8 of Fig. 2 on a screw engaging winding phase 20 since the roundness of the wires provides a groove between wires to engage the screw threads.

It is within the scope of the invention to provide a heterophase coil by winding the coil phases in any manner as long as the heterophase coil is thereby formed in accordance with the description hereinbefore set forth.

What I claim is:

1. An expansion fastener cooperative with screws and bolts comprising a heterophase wire coil with at least two integral helical winding phases spaced axially of each other and connected to each other at their adjacent ends, one of said winding phases being wound in a clockwise direction and another winding phase being wound in counterclockwise direction, one of said winding phases having an internal surface engageable with the threaded portion of said screws and bolts for helical advancement of said screws and bolts therethrough, said other winding phase having an inside diameter sufficiently large to allow free access of bolts and screws therethrough, an end portion of said other winding extending laterally outward forming an anchor means therefor.

2. An expansion fastener cooperative with screws and bolts comprising a heterophase wire coil with at least two integral helical winding phases spaced axially of each other and connected to each other at their adjacent ends, said wire coil consisting of a wire having a substantially rectangular cross-section, one of said winding phases being wound in a clockwise direction and another winding phase being wound in a counterclockwise direction, one of said winding phases having an inner surface provided with a helical projection spaced from the inner edges of the wire forming said coil, said inner surface being engageable with the threaded portion of screws and bolts for helical advancement of said screws and bolts therethrough, said other winding phase having an inside diameter sufficiently large to allow free access of bolts and screws therethrough, an end portion of said other winding extending laterally outward forming an anchor means therefor.

3. An expansion fastener according to claim 2 wherein said heterophase coil consists of a plurality of parallel wires.

4. An expansion fastener according to claim 2, wherein said heterophase coil consists of a plurality of parallel wires and said other winding phase comprising a wire with a beveled surface, said beveled surface being located on the outer surface thereof.

5. An expansion fastener cooperative with screws and bolts, comprising a continuous heterophase wire coil with two integral helical winding phases spaced axially of each other, said wire coil consisting of a pair of wires having a substantially rectangular cross-section, one of said winding phases being wound in a clockwise direction and the other winding phase being wound in a counterclockwise direction, said wires being bent into a substantially U-shape between said winding phases thereby allowing reversal of said windings from said clockwise direction to said counterclockwise direction, one of said winding phases having an inner surface engageable in frictional contact with the threaded portion of said screws and bolts for helical advancement of said screws and bolts therethrough, said other winding phase having an inside diameter sufficiently large to allow free access of screws and bolts therethrough, an end portion of said other winding extending laterally outward forming an anchor means therefor.

JOHN WILLIAM ARNOLD.

References Cited in the file of this patent

UNITED STATES PATENTS

| Number | Name | Date |
| --- | --- | --- |
| 354,672 | Barling | Dec. 21, 1886 |
| 556,082 | Boeddinghaus | Mar. 10, 1896 |
| 1,419,979 | Ogden | June 20, 1922 |
| 1,966,520 | Rayner | July 17, 1934 |
| 2,407,879 | Haas | Sept. 17, 1946 |
| 2,464,808 | Hattan | Mar. 22, 1949 |

FOREIGN PATENTS

| Number | Country | Date |
| --- | --- | --- |
| 525,773 | France | Sept. 27, 1921 |